US006852056B2

(12) United States Patent
Weeramantry

(10) Patent No.: US 6,852,056 B2
(45) Date of Patent: Feb. 8, 2005

(54) CONTINUOUSLY VARIABLE HYDRO-MECHANICAL TRANSMISSION

(75) Inventor: Cecil A. Weeramantry, Darien, IL (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 10/345,578

(22) Filed: Jan. 16, 2003

(65) Prior Publication Data

US 2003/0109347 A1 Jun. 12, 2003

Related U.S. Application Data

(62) Division of application No. 09/740,469, filed on Dec. 19, 2000, now Pat. No. 6,565,471.

(51) Int. Cl.[7] ............................................. F16H 47/04
(52) U.S. Cl. .......................................... 475/73; 475/82
(58) Field of Search ............................. 475/82, 81, 72, 475/73

(56) References Cited

U.S. PATENT DOCUMENTS

| 3,714,846 | A | | 2/1973 | Louis e tal. | |
|---|---|---|---|---|---|
| 3,744,344 | A | | 7/1973 | Olsen et al. | |
| 3,796,111 | A | | 3/1974 | Schauer | |
| 3,903,756 | A | | 9/1975 | Hamma | |
| 3,969,958 | A | * | 7/1976 | Miyao et al. | ................. 475/82 |
| 4,019,404 | A | | 4/1977 | Schauer | |
| 4,138,907 | A | | 2/1979 | Melles | |
| 4,259,881 | A | | 4/1981 | Meyerle | |
| 4,286,477 | A | * | 9/1981 | Meyerle et al. | ............... 475/82 |
| 4,304,151 | A | * | 12/1981 | Meyerle et al. | ............... 475/82 |
| 4,471,668 | A | | 9/1984 | Elsner | |
| 4,913,004 | A | | 4/1990 | Panoushek et al. | |
| 4,976,665 | A | * | 12/1990 | Hagin et al. | .................. 475/82 |
| 5,011,463 | A | | 4/1991 | Jarchow et al. | |
| 5,024,278 | A | | 6/1991 | Shuknecht | |
| 5,052,986 | A | | 10/1991 | Jarchow et al. | |
| 5,156,577 | A | * | 10/1992 | Fredriksen et al. | ........... 475/72 |
| 5,222,921 | A | * | 6/1993 | Garcia | ......................... 475/72 |
| 5,403,241 | A | | 4/1995 | Jarchow et al. | |
| 5,494,142 | A | | 2/1996 | Kale | |
| 5,496,223 | A | | 3/1996 | Jarchow | |
| 5,505,267 | A | | 4/1996 | Orbach et al. | |
| 5,549,185 | A | | 8/1996 | Kale | |
| 5,643,122 | A | * | 7/1997 | Fredriksen | .................... 475/81 |
| 5,667,452 | A | | 9/1997 | Coutant | |
| 5,865,700 | A | | 2/1999 | Horsch | |
| 6,042,496 | A | * | 3/2000 | Lehle et al. | .................. 475/81 |
| 6,440,026 | B1 | | 8/2002 | Johnson et al. | |
| 6,450,912 | B2 | | 9/2002 | Todeschini | |
| 2001/0034283 | A1 | | 10/2001 | Todeschini | |

FOREIGN PATENT DOCUMENTS

WO     WO 02/27214 A1    4/2002

* cited by examiner

*Primary Examiner*—Ha Ho
(74) *Attorney, Agent, or Firm*—Collin A. Webb; John William Stader

(57) ABSTRACT

A transmission for use with a power source and a load includes a primary sun gear adapted to be coupled to the power source, a hydrostatic power unit including a pump coupled to a motor, a ring gear driven by the motor, a secondary sun gear coupled to a first output shaft, a compound planetary gear carrier coupled to a second output shaft and a compound planetary gear carried by the compound planetary gear carrier and in engagement with the ring gear and the secondary sun gear. The first output shaft and the second output shaft are adapted to be selectively coupled to the load.

1 Claim, 4 Drawing Sheets

CONTINUOUSLY VARIABLE HYDRO-MECHANICAL TRANSMISSION

CROSS-REFERENCE TO RELATED PATENT APPLICATIONS

This divisional application claims priority under 35 U.S.C. § 120 from U.S. patent application Ser. No. 09/740,469 filed on Dec. 19, 2000 now U.S. Pat. No. 6,565,471 by Weeramantry et al. with the same title, the full disclosure of which is hereby incorporated by reference.

FIELD OF THE INVENTION

The present invention relates to an improved transmission of the type including a combination of hydrostatic (fluid) and mechanical devices.

BACKGROUND OF THE INVENTION

Both hydrostatic transmissions and geared transmissions are used in agricultural and construction equipment to transmit power from power sources, such as internal combustion engines to equipment for accomplishing a desired task. For example, transmissions are used to properly transmit power to the wheels of a vehicle, or to a vehicle implement. Two important considerations in selecting transmissions are their efficiency and range of input and output speed variability. In general, hydrostatic transmissions provide extremely high-speed variability between the input and output, but are less efficient than geared transmissions. Unlike construction equipment applications, the agricultural applications require prolonged operation at full power in the "tillage" or "working" speed range. Under these conditions, optimum efficiency is required. Further, "on road" haulage performance requirements similar to that of a truck is desired for operating the work vehicle on the highway. In certain instances, it is required that the work vehicle has the capability of maintaining a road speed of 50 km per hour.

In an agricultural equipment application, such as on a tractor, power to drive an implement is typically obtained from a power take-off (PTO) device that is coupled to the tractor's primary power source or engine. When the tractor is using the PTO, the engine speed must be held constant to maximize the efficient use of the implement. With a conventional transmission, such situation cannot be maintained if the tractor speed changes since that will affect the PTO's rpm and therefore affect the implement's efficiency.

Thus there is a need for a transmission for use with agricultural equipment that will provide a constant horsepower with the ability to change speed and torque in a seamless manner, in other words, "continuously variable". There is also a need for a continuously variable hydro-mechanical transmission that provides a "working range" for tillage and heavy draw bar applications and a "roading range" for haulage and transport on the highway.

SUMMARY OF THE INVENTION

According to one aspect of the present invention, a transmission for use with a power source and a load includes a primary sun gear adapted to be coupled to the power source, a hydrostatic power unit including a pump coupled to a motor, a ring gear driven by the motor, a secondary sun gear coupled to a first output shaft, a compound planetary gear carrier coupled to a second output shaft and a compound planetary gear carried by the compound planetary gear carrier and in engagement with the ring gear and the secondary sun gear. The first output shaft and the second output shaft are adapted to be selectively coupled to the load.

According to another aspect of the present invention, a work vehicle includes a power source and a transmission. The transmission includes a primary sun gear coupled to the power source, a hydrostatic power unit including a pump coupled to a motor, a ring gear driven by the motor, a secondary sun gear coupled to a first output shaft, a compound planetary gear carrier coupled to a second output shaft and a compound planetary gear carried by the compound planetary gear carrier and in engagement with the ring gear and the secondary sun gear. The first output shaft and the second output shaft are selectively coupled to the load.

According to another aspect of the present invention, a transmission includes a hydrostatic power unit including a pump coupled to a motor, a primary sun gear adapted to be coupled to a power source, a secondary sun gear selectively coupled to the motor, a ring gear selectively coupled to the motor in synchronization with the secondary sun gear, a compound planetary gear carrier coupled to an output shaft and a compound planetary gear cluster carried by the compound planetary gear carrier and in engagement with the ring gear and the secondary sun gear.

DETAILED DESCRIPTION OF THE EXEMPLARY EMBODIMENTS

Figure 1:
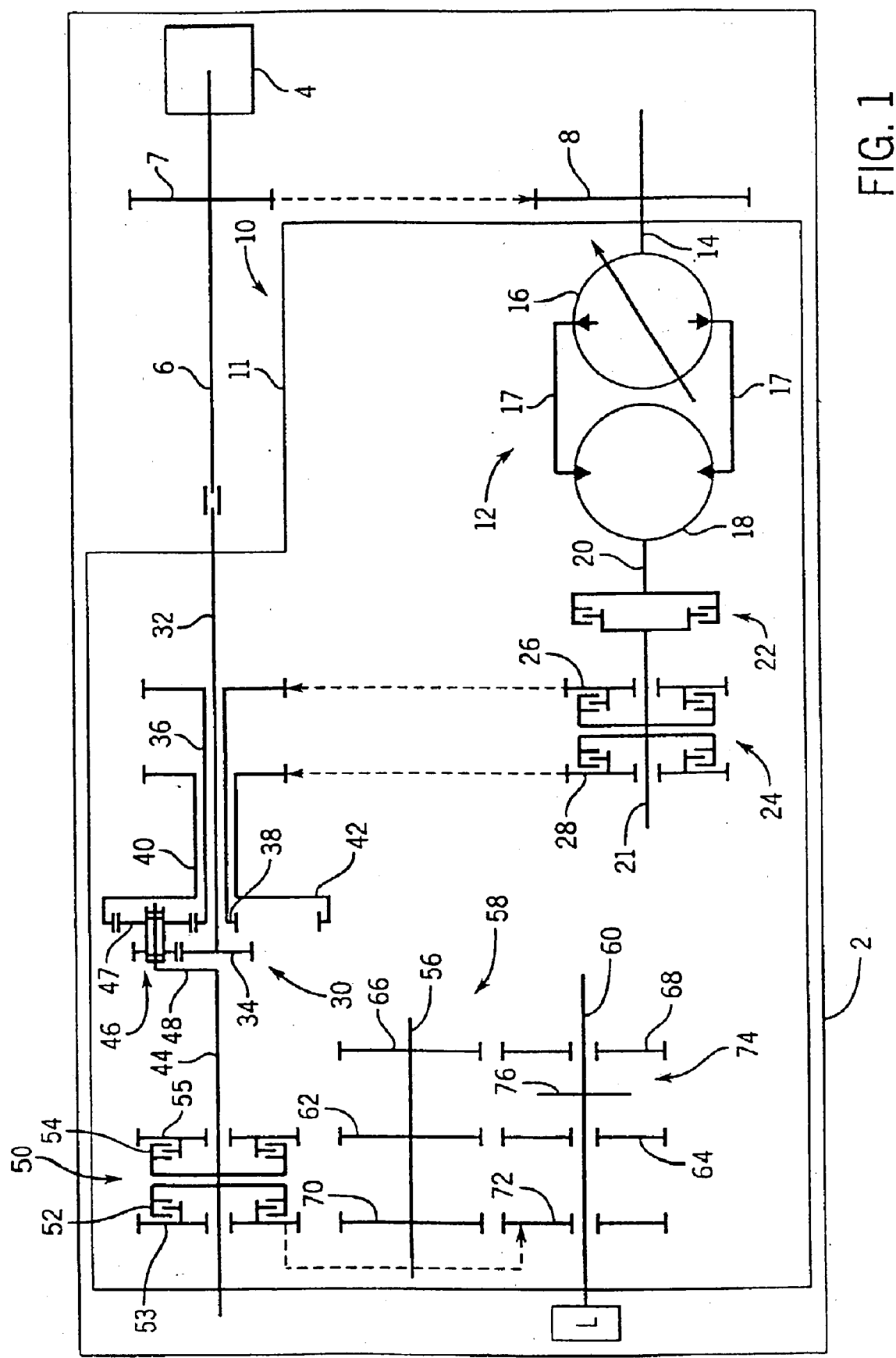
FIG. 1 is an exemplary embodiment of a work vehicle with the present continuously variable hydro-mechanical transmission configured with four input shafts and one output shaft and further providing for two different hydrostatic inputs, whereby the hydro-mechanical transmission can provide a pure mechanical power flow or a combined hydro-mechanical power flow from the vehicle power source.

FIG. 1 is a schematic diagram of a work vehicle, such as an agricultural tractor designated by the reference numeral 2. Vehicle 2 includes a power source for such as an internal combustion engine mechanically coupled to a continuously variable hydro-mechanical transmission 10. A hydro-mechanical transmission 10 drives the hydrostatic power unit 12 and a compound planetary gear unit 30 which are coupled to a range gear set 58 mounted within the transmission housing 11 and coupled to a load L which can be the wheels of the vehicle. It should be understood that the vehicle can also be operated with tracks supported by the wheels and that the work vehicle may be articulated with appropriate coupling and power transmission equipment between the articulated parts.

Continuously variable hydro-mechanical transmission 10 is supported in the work vehicle 2 by a housing or support frame 11. The hydro-mechanical transmission 10 comprises a transmission housing 11 with a hydrostatic power unit 12 associated with the housing 11 and including a pump 16 coupled to a motor 18 with the hydrostatic power unit 12 coupled to a first input shaft 14 and a first output shaft 20. The hydrostatic power unit 12 is coupled to a synchronous lockup clutch 24 by the first output shaft 20. Depending upon the desired speed of work vehicle 2 or the desired rpm of the load L, an electronic controller actuates clutch 24 to couple drive gears 26, 28 to input shafts 36 and 40, respectively, to select an appropriate hydrostatic input gear range. At the same time, the electronic controller also adjusts the angle of a swash plate of motor 18. The motor 18 of the hydrostatic power unit 12 is connected to the pump 16 by appropriate hydraulic conduits 17 and appropriate fluid filters and storage tanks (not shown) as required. The pump 16 and motor 18 are operated in a closed circuit. An exemplary embodiment of the hydrostatic power unit 12 is provided with a variable displacement hydraulic pump and a fixed displacement hydraulic motor, preferably with an electronically controlled variable displacement hydraulic pump. A hydrostatic power unit driving gear 7 coupled to the input shaft 6 from the power source 4 with the hydrostatic power unit driving gear 7 engaging a hydrostatic power unit driven gear 8 that is coupled to the first input shaft 14 drives the hydrostatic power unit 12.

Figure 2:
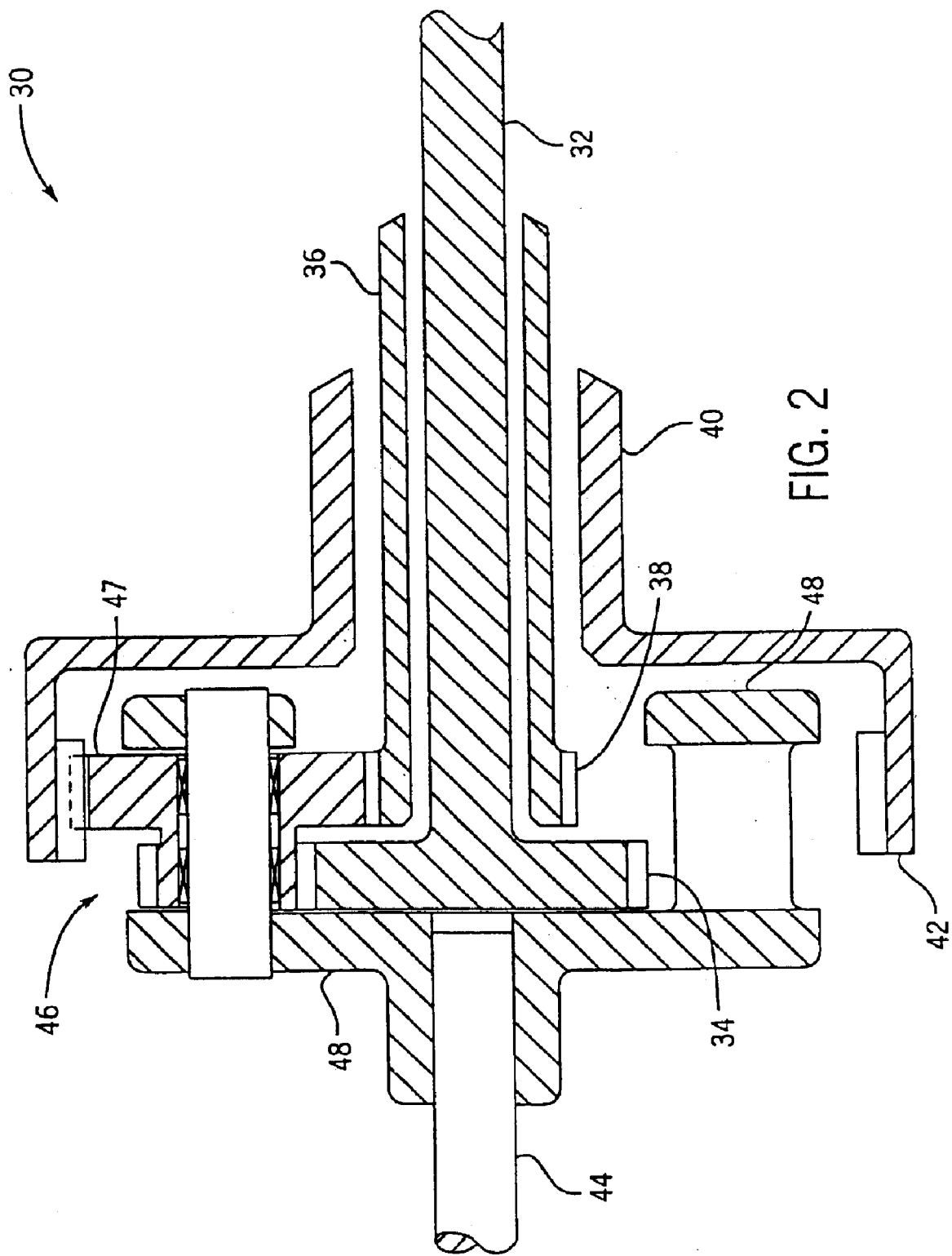
FIG. 2 is a partial sectional view of an exemplary embodiment of a compound planetary gear unit illustrated in FIG. 1.

The hydro-mechanical transmission 10 also includes a compound planetary gear unit 30 mounted in the housing and coupled to the power source 4 with a second input shaft 32 and the input shaft 6 from the power source. The compound planetary gear unit 30 also includes a third input shaft 36, a fourth input shaft 40 and a second output shaft 44. The second input shaft 32, the third input shaft 36, the fourth input shaft 40 and the second output shaft 44 are all coaxial with the second input shaft 32 inside the hollow third input shaft 36 which in turn is within the fourth input shaft 40 as shown in FIGS. 1 and 2. The compound planetary gear unit 30 is selectively coupled to the load L selectively coupled to the hydrostatic power unit 12 and coupled to the power source 4 utilizing various clutches as will be described below. The hydro-mechanical transmission 10 also includes a load shaft 60 which is coupled to the load L and mounted for rotation in the housing 11. An intermediate shaft 56 rotatably mounted in the housing 11 supports a range gear set 58 mounted for rotation in the housing 11 and selectively coupled to the compound planetary gear unit 30 and the load shaft 60.

The compound planetary gear unit 30 comprises a primary sun gear 34 coupled to the second input shaft 32, which is directly coupled to the power source via input shaft 6 from the power source 4. A secondary sun gear 38 is coupled to the third input shaft 36 with the third input shaft 36 selectively coupled to the first output shaft 20 by a synchronous lockup clutch 24. A ring gear 42 is coupled to the fourth input shaft 40, which is selectively coupled to the first output shaft 20 also with the synchronous lockup clutch 24. A compound planetary gear cluster 46 mounted on a compound planetary gear carrier 48 engages with the primary sun gear 34, the secondary sun gear 38 and the ring gear 42. The compound planetary gear carrier 48 is coupled to the second output shaft 32 of the compound planetary gear unit 30. A compound planetary gear carrier 48 supports three compound planetary gears 47 which make up the compound planetary gear cluster 46.

The synchronous lockup clutch 24 selectively engages driving gears 26 and 28 which engage a third input shaft 36 and fourth input shaft 40, respectively. When driving gear 26 is driven by the hydrostatic power unit 12, it drives the secondary sun gear 38. When driving gear 28 is driven by the hydrostatic power unit 12, it drives the fourth input shaft 40, which in turn drives the ring gear 42 within the compound planetary gear unit 30. The above described power transmissions occur in the upstream side of the compound planetary gear unit 30 of the hydro-mechanical transmission 10. On the down stream side of the compound planetary gear unit 30 a single output shaft, designated as the second output shaft 44 is coupled within the compound planetary gear unit 30 with the compound planetary gear carrier 48. The second output shaft 44 is coupled to the directional clutch 50, which has a forward component 54 and a reverse component 52 which respectively drive gears 55 and 53 to control the forward or reverse directions of the work vehicle 2.

An intermediate shaft 56 is rotatably mounted in the housing 11 and supports a road range input gear 62, which in turn engages a road range output gear 64 mounted on the load shaft 60. A work range input gear 66 coupled to the intermediate shaft 56 engages a work range output gear 68 also mounted on the load shaft 60. A reverse gear 70 is coupled to the intermediate shaft 56 and engages an idler reverse gear 72 mounted on the load shaft 60. A range selector 74 is coupled to the load shaft and is used by the operator of the vehicle 2 to select either the road range speeds or the work range speeds. In an exemplary embodiment of the hydro-mechanical transmission, the range selector 74 is a sliding collar or synchronizer 76.

The hydro-mechanical transmission described above can be operated in a pure mechanical configuration in which the compound planetary gear unit 30 is driven only by the power source 4 via input shaft 6 and second input shaft 32. In the pure mechanical configuration, the hydrostatic power unit 12 is disconnected by hydrostatic disconnect clutch 22 coupled to the first output shaft 20. In the pure mechanical configuration, synchronous lockup clutch 24 is actuated into engagement with both driving gears 26 and 28. The hydro-mechanical transmission 10 can also be configured to operate with both the mechanical input directly from the power source 4 via the second input shaft 32 and input from the hydrostatic power unit 12 via driving gears 26 and 28 engaging, selectively, the third input shaft 36 and the fourth input shaft 40 of the compound planetary gear unit 30.

Once the operator selects between the working range and road range speeds by manipulating the range selector 74, controlling the pump swash plate angle in the hydrostatic power unit 12 and the selection of one of the drive gears 26 or 28 coupled to the first output shaft 20 achieve speed control. In low speeds, the hydrostatic drive is driven through ring gear 42, which is coupled to the fourth input shaft 40 and is driven by driving gear 28. The gear ratios in the compound planetary gear unit 30 are designed so that a synchronous condition occurs at the most desirable speed within a given working range. With the vehicle 2 starting from rest, the swash plate angle of the hydraulic motor 18 is increased in order to increase vehicle or rpm speed until a synchronous speed is reached (i.e., the two sun gears, 34 and 38, the ring gear 42 and the planet carrier 48, supporting the compound planetary gear cluster 46 all rotate at the same speed). At that same speed, the synchronous lockup clutch 24 can disengage driving gear 28 and engage driving gear 26 to drive the secondary sun gear 38. With such change occurring at a synchronous speed it is "seamless" with little or no energy dissipation. With the hydrostatic drive being delivered through the secondary sun gear 38, the swash plate angle is reduced to increase speed of the compound planetary gear carrier 48 until a maximum speed of the vehicle 2 is reached. It is also possible for the operator to engage both drive gears 26 and 28 with the synchronous lockup clutch 24 and with disconnect clutch 22 disconnecting output shaft 20 in which all gears of the compound planetary gear unit 30 will be transmitting power and thereby providing a very high efficiency through the hydro-mechanical transmission 10. It has been determined that the optimal speed range for such operation is between 7 and 9 km per hour. As stated above, it is also possible to completely disengage the hydrostatic power unit 12 from the compound planetary gear unit 30 through the hydrostatic disconnect clutch 22. In such instance, only direct mechanical power from the power source 4 is provided to the compound planetary gear unit driving only the primary sun gear 34 which in turn drives the compound planetary gear cluster 46 and the second output shaft 44.

It is also possible for a full shuttle reverse in either the work range or road range by means of the directional clutch 50. Since the directional change occurs downstream of the compound planetary gear unit 30, it is not necessary to change the swash plate position of the pump 16 in the hydrostatic power unit 12 if the same forward to reverse ratio is retained.

The configuration of the hydro-mechanical transmission, described above provides that the synchronized ratio change gear speeds takes place on the input side (upstream side) of the compound planetary gear unit 30 in the hydrostatic power unit 12 with only one output shaft 44 from the compound planetary gear unit 30. It is contemplated, that the control of the various clutches and the swash plate angle of the pump 16 in the hydrostatic power unit 12 can be controlled by an electronic control circuit operated from the cab of work vehicle 2 and utilizing appropriate sensors located at appropriate locations in the work vehicle 2.

In another embodiment, a hydro-mechanical transmission 10 there is no operator preselected work range or road range of speeds per se. However, seamless speed changes from zero to a maximum speed, such as 50 km per hour can be obtained through four gear ranges defined as range "A", "B", "C", and "D" with synchronized shift points between each range to obtain the seamless speed changing. In this embodiment, the synchronized ratio changing takes place on the output side (downstream side) of the compound planetary gear unit 30 which has two coaxial output shafts 44 and 45 and will be discussed more fully below.

Figure 3:
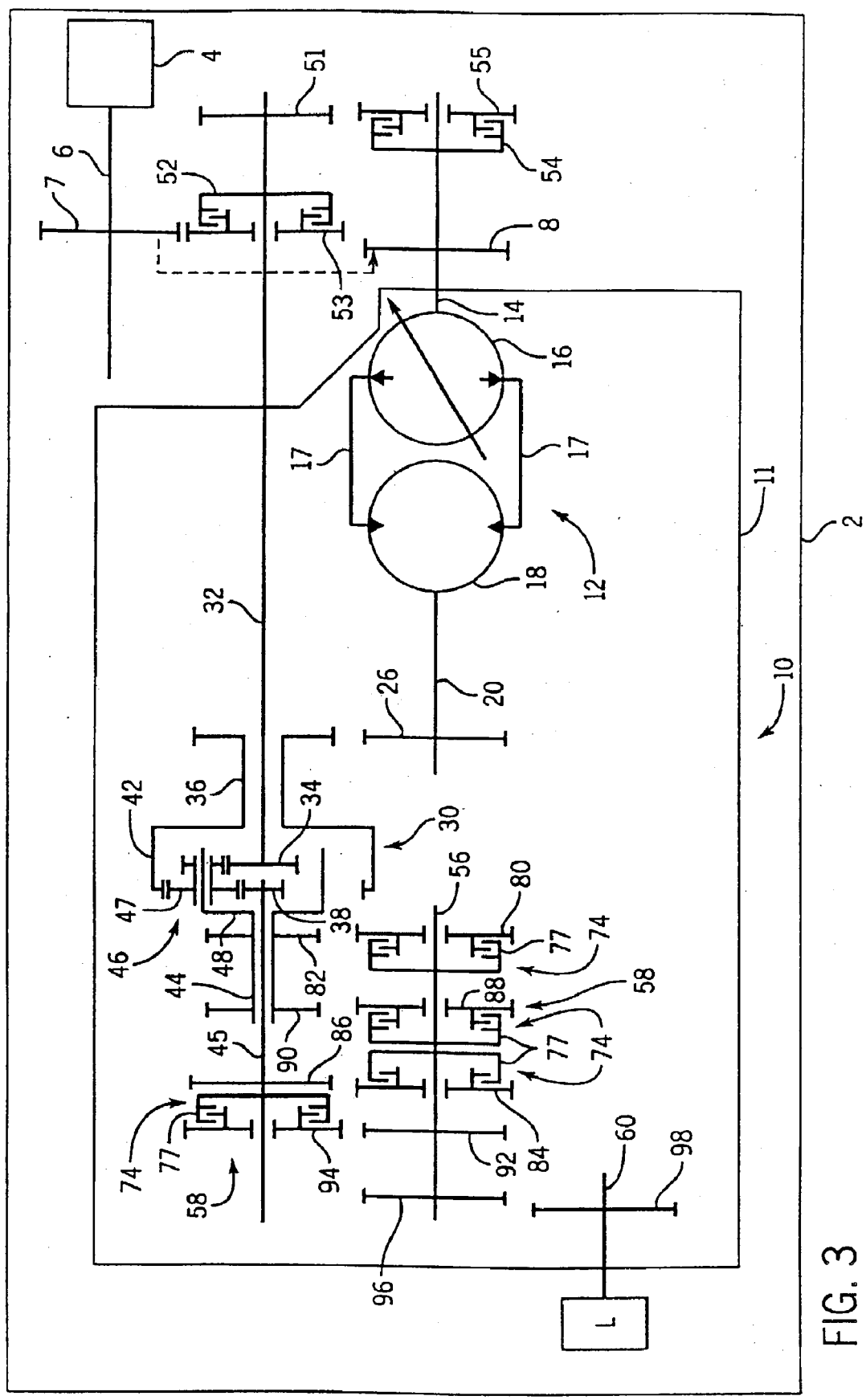
FIG. 3 is an exemplary embodiment of a work vehicle with the present continuously variable hydro-mechanical transmission configured with three input shafts and two output shafts, whereby the hydro-mechanical transmission can provide a pure hydrostatic power flow or a combined hydro-mechanical power flow from the vehicle power source.

FIG. 3 is a schematic diagram of a work vehicle 2 such as an agricultural tractor. Work vehicle 2 includes a power source 4 mechanically coupled to a continuously variable hydro-mechanical transmission 10. The hydro-mechanical transmission 10 selectively drives a hydrostatic power unit 12 and a compound planetary gear unit 30, which in turn drives a plurality of range gear sets 58 which are coupled to a load L. The load can be the wheels of the work vehicle 2.

The hydro-mechanical transmission 10 is supported in the work vehicle by housing or support frame 11. The hydro-mechanical transmission 10 comprises the transmission housing 11, which supports the hydrostatic power unit 12, which is associated with the housing 11. The hydrostatic power unit 12 as shown in FIG. 3 is contained within the hydro-mechanical transmission housing 11 but it may also be external to the housing 11 and accessed with appropriate couplings. The hydrostatic power unit 12 includes a pump 16 coupled to a motor 18 with the hydrostatic power unit 12 coupled to a first input shaft 14 and a first output shaft 20. The power to the hydrostatic power unit 12 is provided by a driven gear 8 mounted on the first input shaft 14 and engaged with a hydrostatic power unit driving gear 7 mounted on the input shaft 6 of the power shaft 4. The pump 16 is in fluid communication with the motor 18 by appropriate conduits 17. The first output shaft 20 rotably supports a gear for engaging a third input shaft of the compound planetary gear unit 30 as described below.

Figure 4:
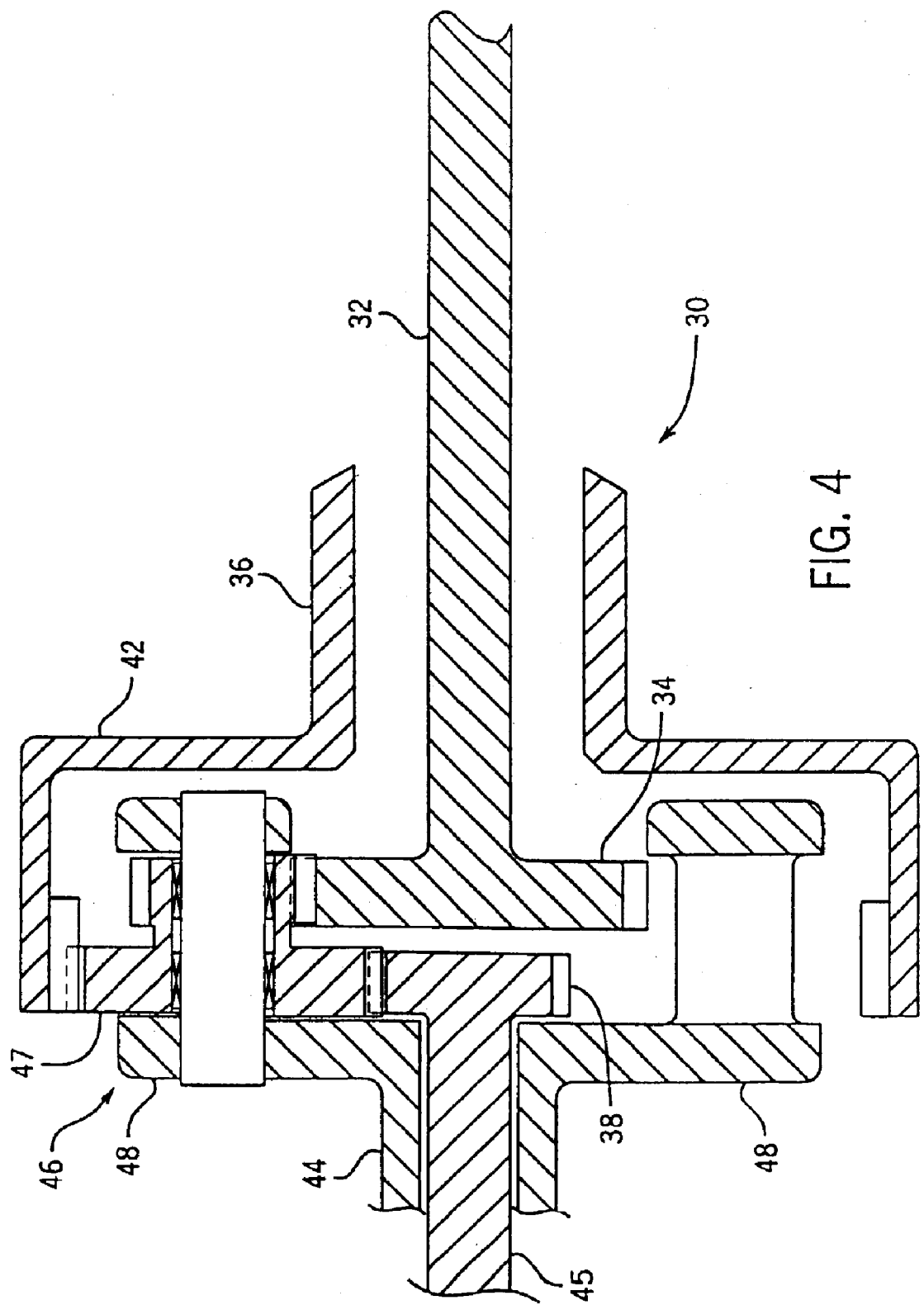
FIG. 4 is a partial sectional view of an exemplary embodiment of a compound planetary gear unit illustrated in FIG. 3.

A hydro-mechanical transmission 10 also includes a compound planetary gear unit 30 mounted in the housing. The compound planetary gear unit 30 includes a second input shaft 32, a third input shaft 36, a second output shaft 44 and a third output shaft 45. (See FIG. 4) The compound planetary gear unit 30 is selectively coupled to the load L, coupled to the hydrostatic power unit 12 and selectively coupled to the power source 4. The compound planetary gear unit 30 can be connected to a plurality of range gear sets 58 as will be described below. The second input shaft 32, the third input shaft 36, the second output shaft 44, and the third output shaft 45 are coaxial with the third input shaft being hollow and the second input shaft, 32 being supported within the third input shaft 36. The second output shaft 44 is hollow and third output shaft 44 is supported within the hollow second output shaft 44 as shown in FIG. 3. The hydro-mechanical transmission 10 also includes a load shaft 60 coupled to the load L and mounted for rotation in the housing. An intermediate shaft 56 supporting a plurality of range gear sets 58 is mounted for rotation in the housing and selectively coupled to the compound planetary gear unit 30 and the load shaft 60.

The compound planetary gear unit 30 of the hydro-mechanical transmission 10 comprises a primary sun gear 34, which is coupled to the second input shaft 32. A ring gear 42 is coupled to the third input shaft 36 and coupled to the first output shaft 20 with the hydrostatic power unit with the gear 26 engaging the third input shaft 36. A compound planetary gear cluster 46 mounted on a compound planetary gear carrier 48 and engaged with the secondary sun gear 30 and the ring gear 42 is mounted within the compound planetary gear unit 30. A compound planetary gear carrier 48 is coupled to the second output shaft 44. The compound planetary gear cluster 46 includes three compound planetary gears 47.

In operation, the continuously variable hydro-mechanical transmission 10 can be configured to have a combined hydrostatic and mechanical power flow by engaging the reverse clutch 52 or forward clutch 54 which respectively drive a reverse drive gear 53 and a forward drive gear 55 which in turn drives the first input shaft 20 and the second input shaft 32. It is also possible to configure the hydrostatic mechanical transmission for a pure hydrostatic power flow by disengaging both clutches 52 and 54 in which case the second input shaft 32 is not directly driven by the power source 4. In the pure hydrostatic configuration, one range gear is coupled to carrier 48 and another range gear 58 is connected to the secondary sun gear 38 simultaneously.

As described above, a preferred exemplary embodiment of the hydro-mechanical transmission 10 provides a variable displacement hydraulic pump 16 and a fixed displacement hydraulic motor 18. It is contemplated that the operator from the cab of the work vehicle can control the swash plate angle of the pump 16 preferably by electronic controls. The plurality of arranged gear sets 58 comprise an A-range output gear 80 coupled to the intermediate shaft 56 and engaged with an A-range input gear 82 mounted on the second output shaft 44. A B-range output gear 84 is coupled to the intermediate shaft 56 and engaged with a B-range input gear 86 mounted on the third output shaft 45. A C-range output gear 88 coupled to the intermediate shaft 56 and engaged with a C-range input gear 90 is mounted on the second output shaft 44. A D-range output gear 92 is coupled to the intermediate shaft 56 and engaged with D-range input gear 94 mounted on the third output shaft 45. A plurality of range selectors 74 is coupled to the intermediate shaft to provide the selection of range gear sets. A typical range selector 74 in this exemplary embodiment is a clutch 77 associated with the respective range gear sets. A main input drive gear 96 is coupled to the intermediate shaft 56 and engaged with a main output drive gear 98, which is mounted on the load shaft 60.

As stated above in this embodiment, there is no selection for a work range or road range per se. However, the four ranges (A–D) provide a seamless transition between ranges similar to the work/road configuration previously described. Speed change from zero to maximum speed is achieved in a smooth and continuous manner by changing the swash plate angle of the pump 16, preferably by appropriate electronic controls. For high efficiency, the first stall point of the motor 18 in the hydrostatic power unit 12 (i.e., ring gear 42 is a relative zero speed point) is selected in the 7–9 km per hour optimum speed range in order to transmit 100% of the power from the power source 4. A full shuttle reverse is also available through the clutches 52 and 54 since the directional change occurs on the input side (upstream side) of the compound planetary gear unit 30. Since directional changes occur on the input side of compound planetary unit gear 30, it may be necessary to adjust the position of the swash plate in motor 18 depending upon the desired forward to reverse speed change ratio. In the low speed pure hydrostatic power flow regenerative heat is kept under control during prolonged creep operation of the work vehicle 2. Also, in the pure hydrostatic power flow mode, different creep speed ranges can be achieved by engaging different combinations of the range clutches. For example, range gear set A, 80, 82 and B range set 84, 86 can be simultaneously engaged through their respective range selectors 74. Similarly, range set 80 can be combined with C or D to obtain a different creep speed range as selected by the operator of the work vehicle 2. With this embodiment, it is also possible to shuttle between forward and reverse in either the combined hydro-mechanical mode or the pure hydrostatic mode. Further, in this embodiment, the vehicle speed can be controlled independent of engine speed enabling constant output speed from the PTO during implement operation.

Thus, there is provided a continuously variable hydro-mechanical transmission which provides seamless speed changes within ranges selected by the operator. One embodiment of the continuously variable hydro-mechanical transmission provides for a synchronized change in speed ranges in the hydrostatic power unit on the input side of the compound planetary gear unit. This enables the continuously variable hydro-mechanical transmission to run at an optimum speed with the compound planetary gear unit locked up and all power being transmitted mechanically by the power source. Such arrangement facilitates a peak efficiency point and low speed creeper ranges which reduces regenetative heat in the transmission. A single output shaft from the compound planetary gear unit assists in achieving a full forward to reverse capability without changing the hydraulic pump swashplate angle in the hydrostatic power unit. In another embodiment, the compound planetary gear unit is configured to have two input shafts and two output shafts which facilitate a pure hydrostatic operation feature in this embodiment of the continuously variable hydro-mechanical transmission. In the pure hydrostatic mode of operation, three different creep speed ranges can be achieved by engaging different combinations of the four range gear sets located downstream of the compound planetary gear unit within the transmission housing. This embodiment of the continuously variable hydro-mechanical transmission allows a work vehicle speed to be controlled independent of the engine speed of the work vehicle and enabling a constant output speed from the power unit 12 coupled to the present transmission.

It will be understood that the foregoing descriptions are for preferred embodiments of this invention and that the invention is not limited to the specific forms shown. Other modifications may be made in the design and arrangement of other elements without departing from the scope of the invention as expressed in the appended claims.

What is claimed is:

1. A transmission for use between a power source and a load, the transmission comprising:
   a hydrostatic power unit, including a pump, coupled to a first input shaft adapted to be coupled to the power source, the hydrostatic power unit including a first output shaft; and
   a compound planetary gear unit including a second input shaft directly coupled to the power source and selectively coupled to the first output shaft of the hydrostatic power unit by at least third and fourth input shafts each driven by a different driving gear respectively interconnecting the first output shaft and either the third or fourth input shaft,
   the compound planetary gear unit further including:
      a primary sun gear coupled to the second input shaft;
      a secondary sun gear coupled to the third input shaft;
      a ring gear coupled to the fourth input shaft;
      a compound planetary gear cluster mounted on a planetary gear carrier and in engagement with the primary sun gear, the secondary sun gear and the ring gear;
      a second output shaft coupled to the planetary gear carrier;
      a directional clutch coupled to the second output shaft;
      a load shaft adapted to be coupled to the load; and
      a road range gear set selectively coupled between the load shaft and one of the third input shaft and the planetary gear carrier, whereby the transmission may be selectively operated either in a purely mechanical configuration or in a mixed hydro-mechanical configuration.

* * * * *